March 15, 1932.  W. J. KUNTZ  1,849,462
LIME SLAKER
Filed Feb. 5, 1930
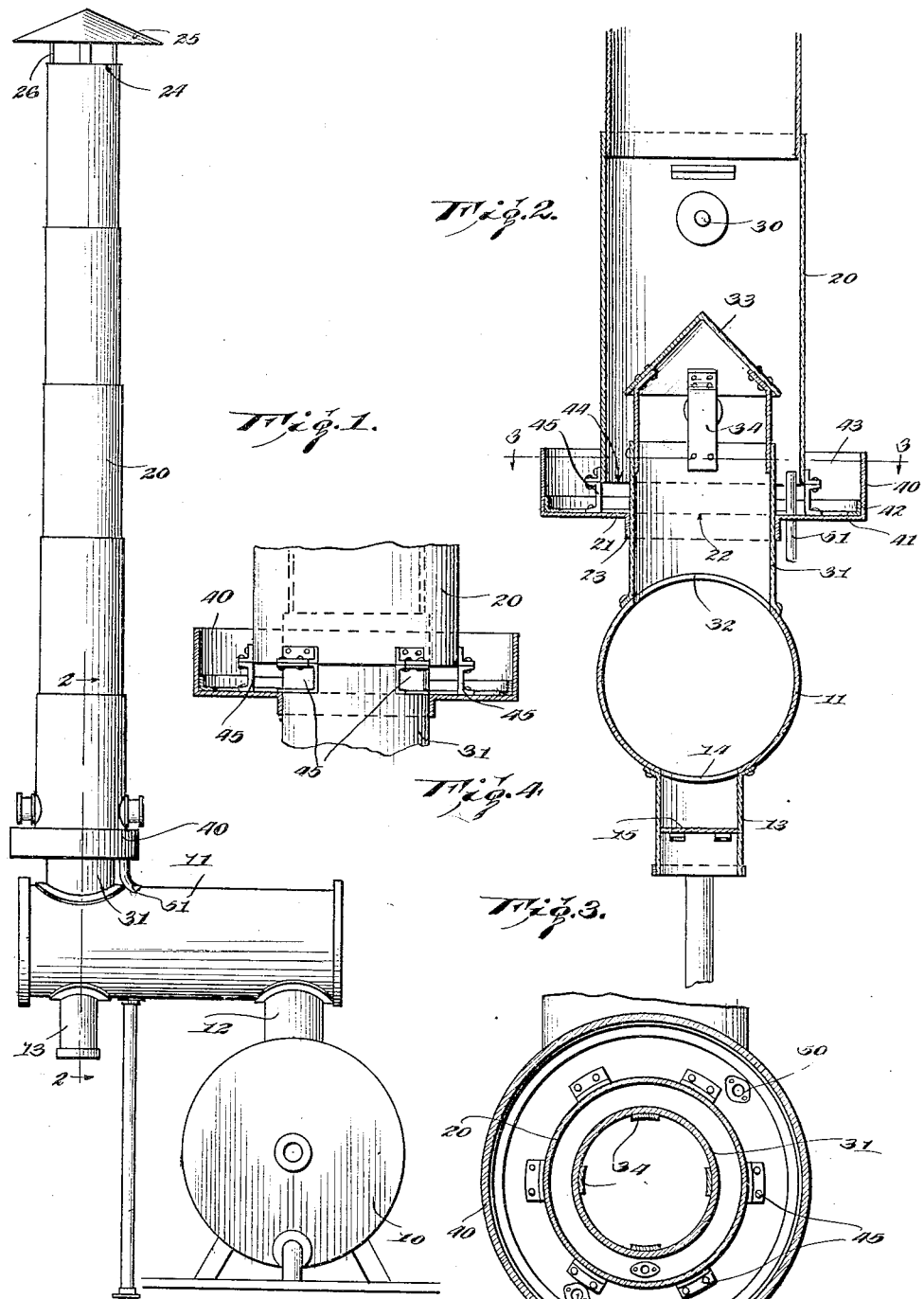
WITNESSES
C. H. Mann
Harry E. Seidel
INVENTOR
W. J. Kuntz,
BY
Mann & Co.
ATTORNEY Patented Mar. 15, 1932

1,849,462

UNITED STATES PATENT OFFICE

WILLIAM JACOB KUNTZ, OF YORK, PENNSYLVANIA

LIME SLAKER

Application filed February 5, 1930. Serial No. 426,093.

This invention relates to a lime slaker.

It has been proposed to provide a tower through which the steam carrying the minute particles of lime is passed and sprayed with water for precipitating the lime with a chamber within the bottom of the tower to receive the milk of lime thus formed and retain it until it is desired to utilize it in a hydrator connected with the tower and from which the lime-charged steam has been evolved. In this connection it is necessary to stop operation of the plant and insert a hose in a manhole in the tower for flushing out lime which had settled to the bottom of the chamber and which clogs the lower portion of the tower and prevents the milk of lime from being withdrawn and charged into the hydrator.

An object of the present invention is the provision of a tank embracing the bottom of the tower and extending laterally from the walls of the tower to form a storage for the milk of lime which falls to the bottom of the tank. A plurality of openings are provided in the bottom wall of the tower for placing the tower in communication with the tank so that the milk of lime may flow outwardly into the tank and be withdrawn and charged into the hydrator. If it be found that a considerable quantity of sediment is being deposited in the tank it is only necessary to apply the hose to the outer open end of the tank and exteriorly of the tower for flushing the sedminet from the tower and the tank without necessitating the shutting down of the plant.

A further object of the invention is the provision of a tower to receive the lime-laden steam from a hydrator where the steam is sprayed with water to precipitate the lime to the bottom of the tower, provision being made to collect the milk of lime thus formed exteriorly of the tower to withdraw the milk of lime for charging the same into the hydrator, sediment collecting in the bottom of the tower and the external means being readily flushed from the tower and externally of the same without necessitating the shutting down of the plant.
This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in elevation of a hydrator and communicating tower forming the subject-matter of my invention, Figure 2 is a fragmentary vertical section taken on the line 2—2 of Figure 1,

Figure 3 is a horizontal section taken along the line 3—3 of Figure 2,

Figure 4 is a fragmentary view in elevation with parts broken away showing the passages between the tower and tank located exteriorly of the tower.

Referring more particularly to the drawings, 10 designates a hydrator of well known construction and which is described in my co-pending application, Serial No. 274,580, filed May 2, 1928. One end of the hydrator is in communication by means of a pipe 12 connected wth a drum 11 disposed in a horizontal position. One end of the drum is provided with a discharge pipe 13 in communication, at 14, with said drum, and a valve 15 mounted in the pipe 13 is adapted to permit the discharge of any lime which has collected in the drum.

A tower 20 is supported in a vertical position by any approved means (not shown). This tower has a base 21 provided with a circular opening 22 from which depends a flange 23. The tower is open at the top, as shown at 24 in Fig. 1, and is provided with a cap 25 supported by rods 26 to permit the escape of steam from the tower as will be presently explained.

At spaced intervals a spraying device 30 is connected with the tower for causing a fine spray of water to be projecting horizontally of the tower and which spray is adapted to contact with the lime-laden steam rising through the tower and which has been evolved in the member 10 during the hydration of the lime. Such a construction provides for the recovery of those fine particles of lime which are ordinarily carried off to the atmosphere while at the same time producing milk of lime which is carried back to the hydrator and utilized in the hydration of the lime for a greater yield.

A vertically disposed drum 31 is received within the passage 22 in the base member 21 and is embraced by the flange 23 and sealed to said flange to prevent the escape of lime water from the tower along the sides of the drum 31. This drum is in communication, at 32, with the drum 11. A cap or cover 33 conically-shaped is secured to the top of the drum by the bars 34 which provide openings for the escape of the lime-laden steam entering the drum 31 and the drum 11. This lime-laden steam passes upwardly through the tower and is sprayed at intervals with water. The base member 21 of the tower is extended laterally beyond the outer wall of the tower 20 and a circular flange 40 is secured to the extension 41 of the base member 21 by means of angle irons 42 in order to provide an annular tank 43 embracing the lower end of the tower 20.

It will be noted that the tower at its lower end terminates at 44 above the base member 21 and is secured to said base member by means of spaced angle irons 45 as shown more particularly in Fig. 3, thereby providing a plurality of communicating passages between the lower interior of the tower 20 and the tank 43.

A pair of pipes 50 are located at diametrically opposite points and pass through the extension 41 of the base member 21 and terminate at 51 below the top of the flange 40. These pipes are carried downwardly and enter one end of the hydrator 10 for the purpose of conducting milk of lime from the tank 43 to said hydrator.

When the hydrator 10 is in operation lime-laden steam passes through the pipes 12, the drum 11, and the vertically disposed drum 31 through the passages between the bars 34 at the top of the drum 31, after which the lime-laden steam passes upwardly through the tower 20.

At intervals the lime-laden steam is sprayed in the tower with water which precipitates the lime from the steam, causing the lime to settle in the form of milk of lime at the bottom of the tower 20 where it is collected within the tank 43. When this milk of lime reaches a predetermined level it is drained off by the pipes 50 and carried to the hydrator 10.

At times it will be found that thick deposits of the lime are collected in the bottom of the tower 20 and in the tank 43. It is only necessary at this time to apply running water from the hose directly to the tank 43 for causing the thick sludge or sediment collected in the tank and tower to be washed away and passed through the pipes 50 to the hydrator 10. It will be seen that this washing or cleaning action may be had at any time during the operation of the plant without stopping.

I claim:

1. In a lime slaker, a tower, a slaking means in communication with the tower, a water spraying means in the tower, a base member having an extension projecting laterally from the bottom of the tower, a flange connected to the periphery of the extension and spaced from the outer wall of the tower to form with the said base member a tank for the storage of milk of lime formed in the tower, the wall of the tower embraced by the tank being provided with openings for placing the tank in communication with the tower.

2. In a lime slaker, a tower adapted to receive lime-laden steam from slaking lime, means for spraying water on the lime-laden steam to form milk of lime which falls to the bottom of the tower, means for collecting the milk of lime at the bottom of said tower, said means being extended exteriorly of the tower and open to the atmosphere so that said means and the bottom of the tower may be flushed of sediment.

3. In a lime-slaker, a tower, a slaking means in communication with the tower, a water spraying means in the tower, a base member having an extension projecting laterally from the bottom of the tower, a flange connected to the periphery of the extension and spaced from the outer wall of the tower to form with the said base member a tank for the storage of milk of lime formed in the tower, the wall of the tower embraced by the tank being provided with openings for placing the tank in communication with the tower; and means connecting the tank with the slaking means for conducting the milk of lime to said slaking means.

4. In a lime-slaker, a tower adapted to receive lime-laden steam from slaking lime, means for spraying water on the lime-laden steam to form milk of lime which falls to the bottom of the tower, a tank embracing the lower end of the tower and having a bottom co-incident with the bottom of the tower, the tower having passages for placing the lower end of the said tower in communication with the tank so that milk of lime falling to the lower end of the tower will be collected therein and will flow to the tank, the tank being provided with an opening exteriorly of the tower for the reception of a means for flushing sediment from the bottom of the tank.

5. In a lime slaker, a slaking means, a tower in communication with the slaking means to receive lime-laden steam from the slaking means, a water spraying means in the tower to cause the formation of milk of lime with the lime in the steam, a base member for the tower having an opening therein, a tubular member fitting said opening and projecting upon opposite sides of the base member and forming part of the communication between the tower and the slaking means, said base being extended laterally beyond the outer wall of the tower, said tower having passages in the lower end at the base member, a flange upstanding from the extension of the base and forming with the base member and the tubular member a tank for storing milk of lime produced by the spraying of the lime-laden steam passing into the tower.

6. In a device for removing particles from a fluid, a tower through which the fluid carrying the particles is adapted to pass, an inlet for said fluid extending through the bottom of the tower, a hood embracing the top of the inlet, a water spraying means in the tower adapted to cleanse the fluid of the particles, a tank located at the bottom of the tower surrounding the inlet and adapted to collect the water and the rejected particles, said tank extending beyond the periphery of the bottom of the tower, said tower having openings adjacent the tank for placing the lower end of the tower in communication with the portion of the tank which projects beyond the periphery of said tower, and means for conducting the water and particles away from the tank, the portion of the tank exteriorly of the tower being open to the atmosphere so that the tank may be flushed of sediment.

WILLIAM JACOB KUNTZ.